US012809415B2

(12) United States Patent
Escher et al.

(10) Patent No.: US 12,809,415 B2
(45) Date of Patent: Nov. 24, 2026

(54) PEDAL UNIT FOR CONTROLLING A VEHICLE FUNCTION

(71) Applicant: Robert Bosch GmbH, Stuttgart (DE)

(72) Inventors: Guenter Escher, Oberstdorf (DE); Eduard Maiterth, Heilbronn (DE); Manfred Fischer, Oppenweiler (DE); Simon Baumann, Heilbronn (DE); Stefan Weller, Rauenberg (DE); Tillmann Schatz, Lauffen (DE); Timo Knecht, Mundelsheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 19/177,593

(22) Filed: Apr. 13, 2025

(65) Prior Publication Data

US 2026/0147372 A1 May 28, 2026

(30) Foreign Application Priority Data

Apr. 18, 2024 (DE) ..................... 10 2024 203 607.2

(51) Int. Cl.
*G05G 1/483* (2008.04)
*B60K 26/02* (2006.01)
(Continued)

(52) U.S. Cl.
CPC ............. *G05G 1/483* (2013.01); *B60K 26/02* (2013.01); *B60T 7/04* (2013.01); *G05G 1/506* (2013.01)

(58) Field of Classification Search
CPC . G05G 1/48; G05G 1/506; G05G 1/42; B60K 26/02; B60T 7/04
See application file for complete search history.

(56) References Cited

U.S. PATENT DOCUMENTS 4,380,002 A * 4/1983 Neill ......................... B60T 7/06 338/153
10,948,941 B2 * 3/2021 Dohmen ................... B60T 7/06
(Continued)

FOREIGN PATENT DOCUMENTS

DE 1950102 U * 10/1966 ............. G05G 1/483
DE 100 32 574 A1 1/2002
(Continued)

OTHER PUBLICATIONS

Translation of DE 1950102 U obtained from fit database (Year: 1966).*

*Primary Examiner* — Thomas C Diaz
(74) *Attorney, Agent, or Firm* — Maginot, Moore & Beck LLP

(57) ABSTRACT

A pedal unit for actuating a vehicle function includes a pedal head, which has a pad support and a replaceable pedal pad releasably connected to the pad support for receiving an actuation force of a driver's foot. A housing cover and fastening assembly is movable along a vertical direction of the pedal unit. The housing cover has a hat-shaped connection cap on a face facing the pedal head, and the pad support has, on a face facing the housing cover, a receiving opening with a contour adapted to the connection cap. The fastening assembly includes at least one undercut on the connection cap and at least one retaining element on the pad support, which are arranged in the assembled state to form a releasable catch connection between the pad support and the housing cover, which prevents or at least impedes movement of the pad support in the direction of disassembly.

15 Claims, 4 Drawing Sheets

(51) Int. Cl.
*B60T 7/04* (2006.01)
*G05G 1/50* (2008.04)

(56) References Cited

U.S. PATENT DOCUMENTS

| | | | | |
|---|---|---|---|---|
| 11,892,866 | B2 * | 2/2024 | Vanek | G01D 5/14 |
| 2023/0280778 | A1 * | 9/2023 | Vanek | G05G 5/05<br>74/512 |
| 2024/0377852 | A1 * | 11/2024 | Escher | G05G 1/483 |

FOREIGN PATENT DOCUMENTS

| | | | |
|---|---|---|---|
| DE | 103 12 547 | A1 | 10/2004 |
| DE | 10 2019 004 525 | A1 | 1/2021 |
| DE | 10 2023 204 205 | A1 | 11/2024 |
| GB | 550 138 | A | 12/1942 |

* cited by examiner

PEDAL UNIT FOR CONTROLLING A VEHICLE FUNCTION

This application claims priority under 35 U.S.C. § 119 to application no. DE 10 2024 203 607.2, filed on Apr. 18, 2024 in Germany, the disclosure of which is incorporated herein by reference in its entirety.

The disclosure relates to a pedal unit for controlling a vehicle function. The subject matter of the present disclosure is also a method for assembling such a pedal unit and a method of disassembling a pedal head from such a pedal unit.

BACKGROUND

Drive-by-wire systems with pedal assemblies which transmit driver commands only electrically or electronically are known from the prior art. Such drive-by-wire systems comprise, for example, a pedal assembly with a so-called electronic gas pedal or accelerator pedal for drive control or for executing an acceleration function, as well as a brake pedal for a brake-by-wire system for executing a braking function. Another known drive-by-wire system is a steer-by-wire system for steering control. Drive-by-wire refers to driving or controlling a vehicle without mechanical transmission of power from control elements, such as the accelerator pedal, brake pedal or steering wheel, to the corresponding actuating elements of the vehicle, such as the throttle, brakes and/or steering of the vehicle. In other words, in such drive-by-wire systems, the corresponding pedal unit is decoupled from the power flow, and the aforementioned functions are instead controlled via electrical lines and servo motors or electromechanical actuators. Sensor devices of the drive-by-wire systems conventionally detect a driver specification using force-based sensor units to determine the desired intensity of braking or acceleration of the vehicle and to adjust it accordingly via the powertrain and brake system. Eliminating the mechanical connection makes it possible to implement new pedal concepts, because there is no longer a need for a large pedal travel to achieve vehicle deceleration or vehicle acceleration.

DE 103 12 547 A1 discloses a device for accelerating or decelerating a motor vehicle comprising two actuating elements. A first actuating element is used for accelerating, and a second actuating element is used for decelerating the motor vehicle. The actuating elements are actuated by applying a hand or foot force. The operation of the two actuating elements is largely without travel, and the speed of the motor vehicle is kept constant after the hand or foot force is removed from the first actuating element or from the second actuating element as a function of the most recently applied hand or foot force until the first actuating element or the second actuating element are actuated again.

From the subsequently published DE 10 2023 204 205 A1 of the Applicant, a pedal assembly with two pedal units, a pedal unit for actuating a vehicle function, as well as a method for assembling such a pedal unit and a method for disassembling a pedal head from such a pedal unit are known. The pedal unit comprises a modularly constructed pedal head which comprises a pad support and a replaceable pedal pad for receiving an actuating force of a driver's foot and which is connected to a housing cover that is movable via a small stroke along a vertical direction of the pedal unit. The pedal pad is releasably connected to the pad support. In this case, a fastening assembly is configured to connect the pad support to the movable housing cover in a releasable and form-fit and/or friction-fit manner. The pedal assembly comprises a first pedal unit embodied as a brake pedal and a second pedal unit embodied as an accelerator pedal.

From the subsequently published DE 10 2024 201 376 A1 of the Applicant, a sensor module for an actuating device of a motor vehicle as well as such an actuating device for a motor vehicle are known. The sensor module comprises a plate-shaped sensor element attributable or associated with an actuating element of the actuating device, and a sensor housing comprising at least a first cylindrical housing part in which the sensor element is longitudinally supported. In addition, the sensor module comprises at least one force sensor element associated with the sensor element for detecting a force exerted on the sensor element, in particular by means of the actuating element, and/or at least one displacement sensor element associated with the sensor element for detecting a displacement of the sensor element.

SUMMARY

The pedal unit for actuating a vehicle function, with the features of independent claim 1, has the advantage that a tool-free click assembly of a modularly constructed pedal head on a movable housing cover is possible. Such a tool-free assembly is particularly useful if, for example, a carpet is to be placed over the movable housing cover so that only the tip of the housing cover is visible. Due to the modular design of the pedal head and the removable attachment of the pedal head on the movable housing cover, the pedal pad can be easily replaced after the pedal head is disassembled without damaging the movable cover or a sensor housing in which a sensor assembly is arranged. As the replacement of the pedal pad requires force, for example because rubber lips must be widened in order to release the pedal pad from the pad support or to fix it to the pad support, it is advantageous to release the pedal head from the movable housing cover beforehand. As pedal units for controlling vehicle functions for drive-by-wire systems include sensor arrangements, which should not be subjected to undefined lever forces with, for example, large screwdrivers (exceptional misuse), the separability of the pad support from the movable housing cover of the pedal unit is very advantageous. Thus, all work on the pedal pad or on the pad support can then be carried out when disassembled without exerting force on the movable housing cover or the sensor housing comprising the sensor arrangement.

Embodiments of the present disclosure provide a pedal unit for actuating a vehicle function, having a modularly constructed pedal head which comprises a pad support and a replaceable pedal pad releasably connected to the pad support for receiving an actuating force of a driver's foot, a housing cover that is movable via a small stroke along a vertical direction of the pedal unit, and a fastening assembly. The movable housing cover has a hat-shaped connection cap on its front side facing the pedal head, and the pad support has a receiving opening on its front side facing the movable housing cover, the contour of which is adapted to the hat-shaped connection cap. The fastening assembly here comprises at least one undercut introduced into the hat-shaped connection cap and at least one retaining element arranged on the pad support, which are designed to form a releasable snap connection between the pad support and the movable housing cover in the mounted state, which prevents or at least makes movement of the pad support in the disassembly direction difficult.

Embodiments of the pedal unit according to the disclosure may ensure that the pedal head is securely fitted on the movable housing upon application of the actuation force.

Accordingly, in embodiments of the pedal unit, a counter-contour to the hat-shaped connection cap can be provided in the pad support in order to provide a positive-locking and/or friction-locking close coupling between the pedal head and/or pad support and the movable housing cover. This allows actuation forces to be transferred directly from the driver's foot via the pedal pad, the pad support to the movable housing cover. At the same time, as stated above, it may be advantageous to assemble the pedal head only after laying the carpet in the vehicle. After assembly, the pedal head must not independently disengage from the movable housing cover. Thus, the fastening assembly is arranged such that movement of the pad support in the direction of disassembly is prevented or at least made more difficult.

In addition, a method for assembling such a pedal unit is proposed. In this case, the pedal unit is mounted in the vehicle without a pedal head, and then the pedal head, which comprises a pedal pad releasably mounted on a pad support, is attached on a movable housing cover of the pedal unit without tools, such that the pad support of the pedal head is connected to the movable housing cover of the pedal unit via a releasable snap connection.

Embodiments of the disclosure allow for quick mounting of the pedal head on the movable housing cover and can be accomplished with short cycle times and without tools. Toolless pedal head assembly may be accomplished, for example, by attaching the pedal head to the movable housing cover and applying an axial force from above to the pedal pad. The pedal head is pushed onto the movable housing cover until the snap connection is engaged. When the snap position is reached, the pedal head or the pad support is fixed to the movable housing cover so that movement of the cover support in the direction of disassembly is prevented or at least made more difficult.

Furthermore, a method for disassembling a pedal head from such a pedal unit is proposed. In this case, a snap connection between a pad support of the pedal head and a movable housing cover of the pedal unit is released, and the pedal head is subsequently lifted off the movable housing cover.

The disassembly force for releasing the snap connection depends on the design of the fastening assembly and may be carried out without tools or with a simple auxiliary tool. For this purpose, access points for the introduction of the auxiliary tool can be introduced in the pad support at suitable locations. The auxiliary tool may be designed for this purpose to release the snap connection when pressed into the pad support and so that the pedal head may be easily removed. After removal of the auxiliary tool, reassembly of the pedal head may be carried out. This option of disassembly is helpful, for example, if the pedal pad is to be changed due to wear.

The movable housing cover may preferably be connected to a sensor housing, in which at least one sensor arrangement is arranged. The at least one sensor arrangement may be configured to detect and evaluate the stroke movement of the movable housing cover. The controllable vehicle function can, e.g., be a braking function or an acceleration function. In pedal units having a small actuation stroke, the sensor housing is typically fixed. The pedal head having the replaceable pedal pad has a relatively fixed position and, in conjunction with the movable housing cover, only has a small stroke in the range of a few millimeters along the vertical direction of the pedal unit. Also, the pedal pad may have a support structure for a better grip of the driver's foot. One advantage of the pedal units with a small stroke is the possibility of positioning the respective pedal unit up to the movable housing cover and the pedal head in a vehicle interior panel or under a carpet, such that only the pedal head is visible. The carpet may then be positioned on a carrier plate or on a manufacturer's support. This means that a cut-out of the carpet is limited only to the size of the movable cover. If the carpet also had to take into account the larger contour of the pedal head, the cut-out would have to be larger, which would have a negative impact on the overall look. With retrofittable pedal heads, the cut-outs in the carpet reduce to the minimum necessary dimension and are almost completely covered by the pedal heads mounted thereafter. The carpet cut-out may be even smaller if the carpet rests on top of an outer housing of a modified pedal unit that can be mounted in a stationary manner, wherein the movable housing cover is movably mounted between the sensor housing that can be mounted in a stationary manner and the outer housing that can be mounted in a stationary manner, and only releases the cut-out for assembly of the pedal head or the pad support or the size of the hat-shaped connection cap of the movable housing cover.

The at least one sensor arrangement can comprise a movable measuring transducer and a sensor electronics means. Preferably, the at least one sensor arrangement may be configured to detect the small stroke movement of the movable housing cover in a contactless manner. In the present case, the term "sensor electronics means" is understood to mean an electric circuit or component comprising at least one sensor element, which can detect and process or evaluate magnetic, and/or inductive, and/or capacitive signals from the measuring transducer in a contactless manner. A Hall sensor based on a magnetic principle can preferably be used for contactless detection of the small stroke movement. Alternatively, a force sensor may also be used to detect the stroke movement, which can be coupled to the movable housing cover via a spring element. For example the changing spring force can be converted into voltage changes in a sensor element configured as a strain gauge, which can then be amplified and evaluated. Of course, other suitable measuring methods known from the prior art, for example optical, inductive or capacitive measuring methods, can also be used to detect and evaluate the small stroke movement of the movable housing cover.

It is particularly advantageous that at least one plastically deformable rib can be arranged on an inner wall of the receiving opening in the base body of the pad support, which can provide radial tolerance compensation with respect to the hat-shaped connection cap of the movable housing cover. Preferably, a plurality of ribs can be arranged distributed on the inner circumference of the receiving opening, which are plastically deformed in a plastic pad support during assembly and so, with the corresponding design, ensure a close contact between the pedal head or pad support and the movable housing cover without the risk of a "wobbling" pedal head. Thus, in addition to the snap connection and the radial tolerance compensation, the ribs can also achieve a friction-locking connection between the pad support and the movable housing cover. In this way, forces may be passed directly from the driver's foot via the pedal pad and the pad support to the movable housing cover.

In a further advantageous configuration of the pedal unit, a recess for the at least one retaining element can be introduced into a base body of the pad support, which can comprise at least one through-opening to the receiving opening and can form a support bar for the at least one retaining element. In this way, the at least one retaining element can be easily connected to the pad support.

In a further advantageous configuration of the pedal unit, the at least one undercut can be introduced into the hat-shaped connection cap as a partial recess or as a circumferential recess. In this case, the recess can preferably have a semicircular contour, which can be used for a positive-locking or a friction-locking fixation of the pedal pad support. Depending on the material and the manufacturing method of the movable housing cover, the recess can also have other suitable, for example square contours instead of a semicircular contour.

In one advantageous embodiment of the pedal unit, the at least one retaining element can be configured as a spring-elastic retaining clip with at least one snap element. In this case, the at least one snap element can be configured as a snap hook or as a round hook. The design of the at least one snap element can be advantageously influenced by the dismantling force, which is in particular dependent on the contour of the end region of the at least one snap element. A snap element embodied as a snap hook may require relatively high dismantling forces or an auxiliary tool, while a snap element embodied as a round hook may allow for easier dismantling without an auxiliary tool.

In a particularly advantageous configuration of the pedal unit, the spring-elastic retaining clip can be U-shaped with two legs connected to one another via a connecting bar, with a snap element arranged on each of the free ends. In this case, the connecting bar of the U-shaped spring-elastic retaining clip can rest on the support bar such that the two legs of the U-shaped spring-elastic retaining clip can each penetrate a through-opening and the snap elements can be snapped in a corresponding undercut. The retaining clip can be attached to the support bar for example, by hot embossing plastic through central holes in the connecting bar of the retaining clip. Alternatively, attachment on the edge of the retaining clip, for example, by hot embossing of plastic is conceivable, and screws, rivets or adhesive connections can also be used for attachment. Preferably, the connection is mounted such that, when assembled by means of force applied to the pedal pad, the latter also presses onto the retaining clip with the help of the pedaling pad, thus providing additional mechanical stability.

In this embodiment, the legs of the U-shaped spring elastic retaining clip may be spread from above during toolless pedal assembly by the applied axial force. Upon reaching the stop of the pad support on the hat-shaped connection cap of the movable housing cover, the legs of the retaining clip and the corresponding snap elements spring into the recesses of the hat-shaped connection cap of the movable housing cover and establish the snap connection between the pedal head and/or the pad support and the recesses of the hat-shaped connection cap of the housing.

To facilitate spreading of the legs of the U-shaped spring-elastic retaining clip, the legs may have an outwardly-facing slope from the connecting bar. Additionally, or alternatively, the hat-shaped connection cap may comprise a draft above the recess. The mounting force to be applied can depend on the thickness and width of the retaining clip, its pre-tension and its contour. In addition to the contour of the end region of the at least one snap element, the dismantling force to be applied can also depend on the thickness, width and pre-tension of the retaining clip.

Exemplary embodiments of the disclosure are illustrated in the drawings and explained in more detail in the following description. In the drawings, identical reference numerals refer to components or elements performing identical or similar functions.

DETAILED DESCRIPTION

Figure 1:
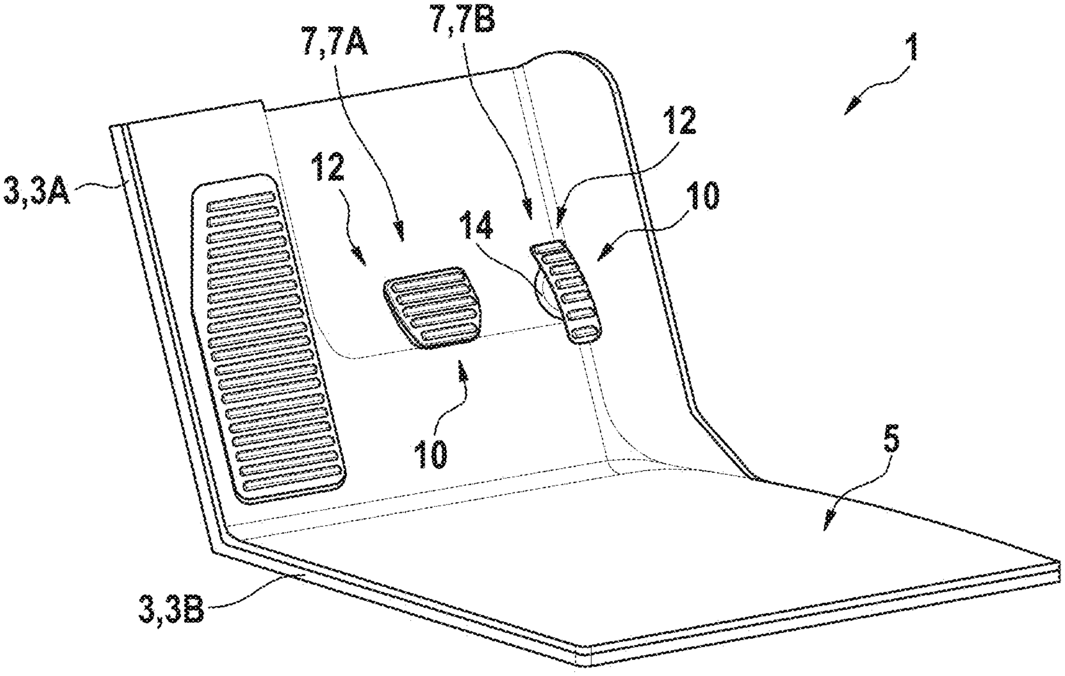
FIG. 1 shows a schematic perspective view of a section of a footwell of a vehicle having a pedal assembly, which comprises two exemplary embodiments of a pedal unit according to the disclosure for controlling a vehicle function.
Figure 2:
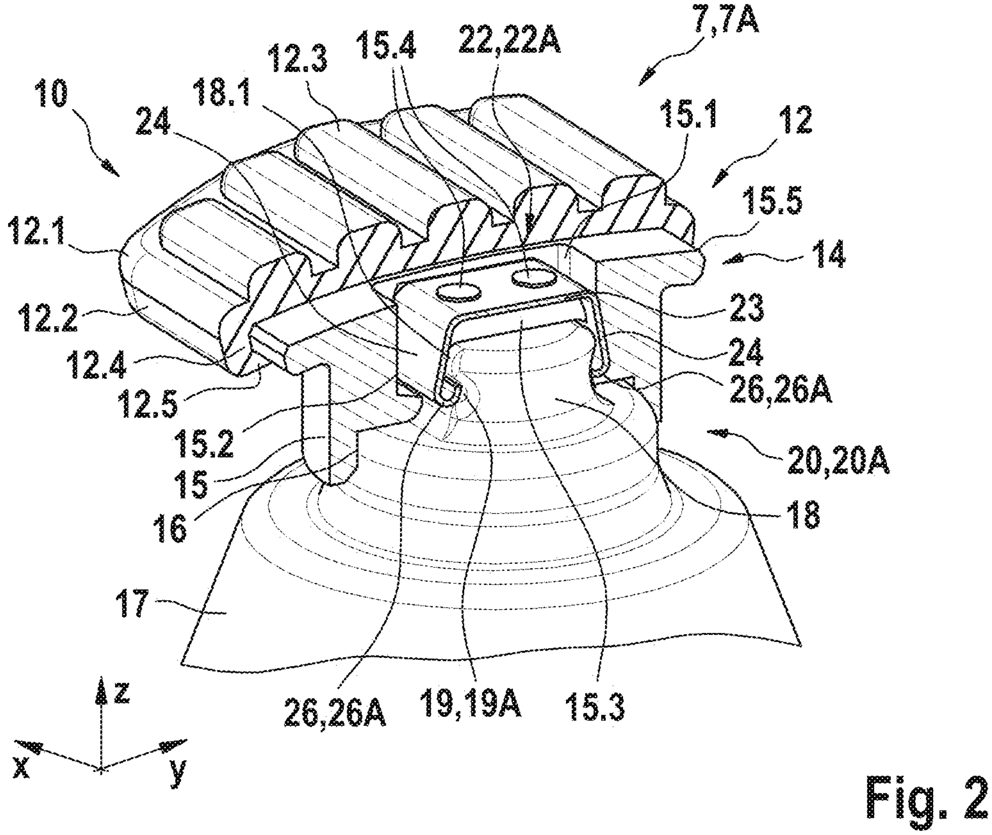
FIG. 2 shows a schematic perspective cross-sectional view of a section of the pedal unit from FIG. 1 with a first exemplary embodiment of a fastening assembly for fastening the pedal head to the movable housing cover.
Figure 3:
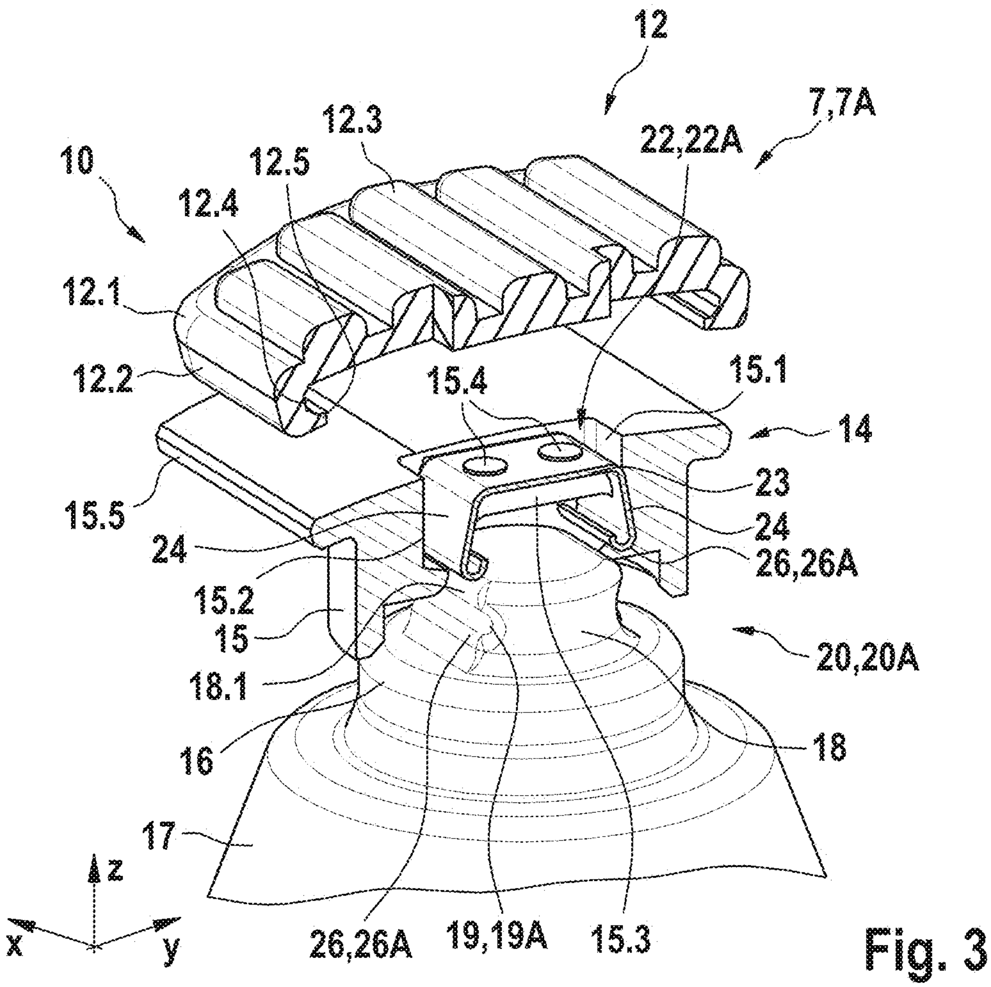
FIG. 3 shows a schematic exploded perspective view of components of the fastening assembly of FIG. 2.

As can be seen in FIGS. 1 to 7, the illustrated exemplary embodiments of a pedal unit 7 according to the disclosure for actuating a vehicle function each comprise a modularly structured pedal head 10, which comprises a pad support 14 and a replaceable pedal pad 12 for receiving an actuating force of a driver's foot, a housing cover 17 movable via a small stroke along a vertical direction z of the pedal unit 7 and a fastening assembly 20. The movable housing cover 17 comprises a hat-shaped connection cap 18 on its front face facing the pedal head 10, and the pad support 14 has a receiving opening 16 on its front face facing the movable housing cover 17, the contour of which is adapted to the hat-shaped connection cap 18. In this case, the fastening assembly 20 comprises at least one undercut 19 introduced on the hat-shaped connection cap 18 and at least one retaining element 22 arranged on the pad support 14, which are designed to form a releasable, snap connection between the pad support 14 and the movable housing cover 7 in the mounted state, which prevents or at least makes movement of the pad support 14 in the disassembly direction difficult.

As can further be seen from FIG. 1, a pedal assembly 1 is arranged in the depicted section of the driver-side footwell of a vehicle with two exemplary embodiments of the pedal unit 7 according to the disclosure for actuating a vehicle function on a body 3 of the corresponding vehicle. Here, the two pedal units 7 are each disposed on and fixed to a partition 3A between the vehicle interior and an engine compartment. Here, a left pedal unit 7 shown is embodied as a brake pedal 7A for performing a braking function, and a right pedal unit 7 shown is embodied as an accelerator pedal 7B for performing an acceleration function. In both exemplary embodiments of the pedal unit 7, the small stroke of the movable housing 17 is in the range of a few millimeters. In a non-illustrated alternative exemplary embodiment, the two pedal units 7 are disposed on and fixed to a vehicle floor 3B. As can be seen further in FIG. 1, the partition 3A and the vehicle floor 3B are covered with a carpet 5.

In the illustrated exemplary embodiments of the pedal unit 7, the pedal head 10 is modularly designed and comprises a pad support 14 and a replaceable pedal pad 12. In each of the exemplary embodiments shown, the pedal pad 12 of the pedal head 10 comprises a curved stainless steel thermoformed bowl 12.1, which is combined with a curved rubber component 12.2, such that a strip-shaped support structure 12.3 protruding from the thermoformed bowl 12.1 is formed on a top side of the thermoformed bowl 12.1. The support structure 12.3 can prevent or at least make it difficult for the driver's foot to slip. The pedal pad 12 is fixedly mounted on the pad support 14. As is further shown in particular in FIGS. 2 and 3, for this purpose, the rubber component 12.2 comprises a circumferential receiving groove 12.4, in which a circumferential overlapping edge of the pad support 15.5 of a hat-shaped base body 15 of the pad support 14 is inserted, such that a wall of the receiving groove 12.4 configured as a flexible lip 12.5 encompasses the edge 15.5 of the base body 15 of the pad support 14. The hat-shaped base body 15 is embodied as a plastic injection molded part in the illustrated exemplary embodiments.

Various embodiments of the fastening assembly 20, which may also be used for the pedal unit 7 designed as an accelerator pedal 7B, are described below using the example of the pedal unit 7 configured as a brake pedal 7A with reference to FIGS. 2 to 6.

As can be seen further from FIGS. 2 to 6, the hat-shaped connection cap 18 comprises two substantially cylindrical regions with different cross-sectional areas and diameters. In this case, an upper cylindrical region facing the pedal head 10 of the hat-shaped connection cap 18 has a smaller cross section and a smaller diameter than a lower region of the hat-shaped connection cap 18. Here, on opposite sides of the upper cylindrical region, two undercuts 19, which are designed as recesses in sections 19A, are introduced into the hat-shaped connection cap 18. In the exemplary embodiments shown, the recesses 19A preferably have a semicircular contour.

In alternative exemplary embodiments of the pedal unit 7 that are not shown, the at least one undercut 19 is introduced into the hat-shaped connection cap 18 as a circumferential recess. Instead of the semi-circular contour, the recess 19A can also have other suitable contours, for example, square contours.

Analogously to the different cross sections and diameters of the hat-shaped connection cap 18, the receiving opening 16 in the base body 15 of the pad support 14 is also designed with two different cross sectional areas and diameters. Here, an upper region of the receiving opening 16 with the smaller cross-section and the smaller diameter receives the upper region of the hat-shaped connection cap 18 and a lower region of the receiving opening 16 with the larger cross-section and the larger diameter receives the lower region of the hat-shaped connection cap 18. As can further be seen from FIGS. 2 to 6, a recess 15.1 for the at least one retaining element 22 is introduced into the base body 15 of the pad support 14 on the front face facing the pedal pad 12, which has at least one through-opening 15.2 towards the receiving opening 16 and forms a support bar 15.3 for the at least one retaining element 22.

In the illustrated exemplary embodiments, at least one plastically deformable rib 16.1 is arranged on an inner wall of the receiving opening 16 in the base body 15 of the pad support 14, which results in a radial tolerance compensation with respect to the hat-shaped connection cap 18 of the movable housing cover 17. As can be seen in particular from FIG. 4, the receiving opening 16 comprises a plurality of ribs 16.1 distributed evenly on the inner circumference on the inner wall of the lower cylindrical region. These ribs 16.1 are plastically deformed during assembly and in the illustrated exemplary embodiments result in a close contact and a positive-locking connection between the pedal head 10 or the pad support 14 and the movable housing cover 17 or the hat-shaped connection cap 18 in addition to the radial tolerance compensation.

In the illustrated exemplary embodiments of the pedal unit 7, the at least one retaining element 22 is configured as a spring-elastic retaining clip 22A, 22B with at least one snap element 26. As can be further seen from FIGS. 2 to 6, the spring-elastic retaining clip 22A, 22B is U-shaped with two legs 24 connected to one another via a connecting bar 23, with a snap element 26 disposed at each of their free ends. Here, the connecting bar 23 of the U-shaped spring-elastic retaining clip 22A, 22B rests on the support bar 15.3 such that the two legs 24 of the U-shaped spring-elastic retaining clip 22A, 22B each penetrate a through-opening 15.2 and the snap elements 26 are snapped into a corresponding undercut 19. The fixation of the U-shaped spring-elastic retaining clip 22A, 22B on the support bar 15.3 in the recess 15.1 in the base body 15 of the pad support 14 is carried out in the illustrated exemplary embodiment by forming or hot embossing the base body 15 of the pad support 14 made of plastic such that resulting plastic fixations 15.1 penetrate through corresponding openings (not described in further detail) in the connecting bar 23 and hold the connecting bar 23 of the U-shaped spring-elastic retaining clip 22A, 22B on the support bar 15.3 of the base body 15 of the pad support 14. Alternatively, the connecting bar 23 of the U-shaped spring-elastic retaining clip 22A, 22B may also be fixed to the support bar 23 by screws, rivets or bonding.

As can be further seen from FIGS. 2 to 5, the snap elements 26 in the illustrated first exemplary embodiment of the fastening assembly 20A are configured as snap hooks 26A. In the snapped state shown, the open ends of the snap hooks 26 engage a top edge of the undercuts 19, which are designed as recesses 19A. As can further be seen in particular from FIG. 5, the two legs 24 each have a slope facing outward of greater than 90 degrees away from the connecting bar 23 in the snapped state shown.

Figure 5:
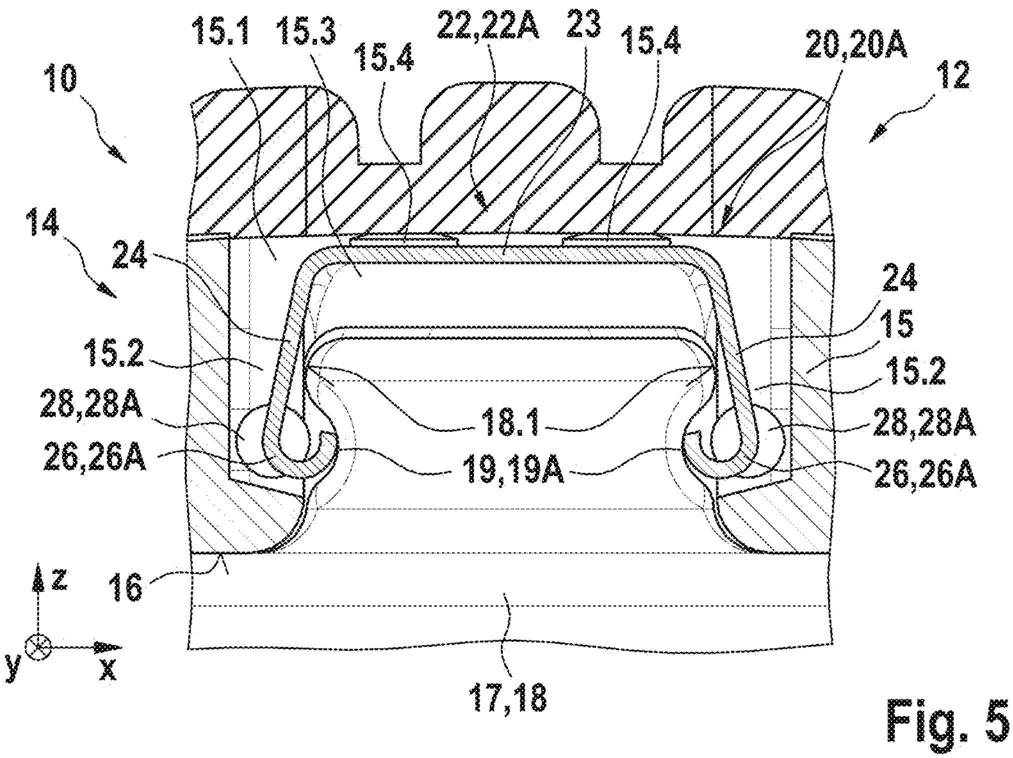
FIG. 5 shows a schematic cross-sectional diagram of the first exemplary embodiment of the fastening assembly for the pedal units of FIGS. 1 to 4 according to the disclosure.
Figure 6:
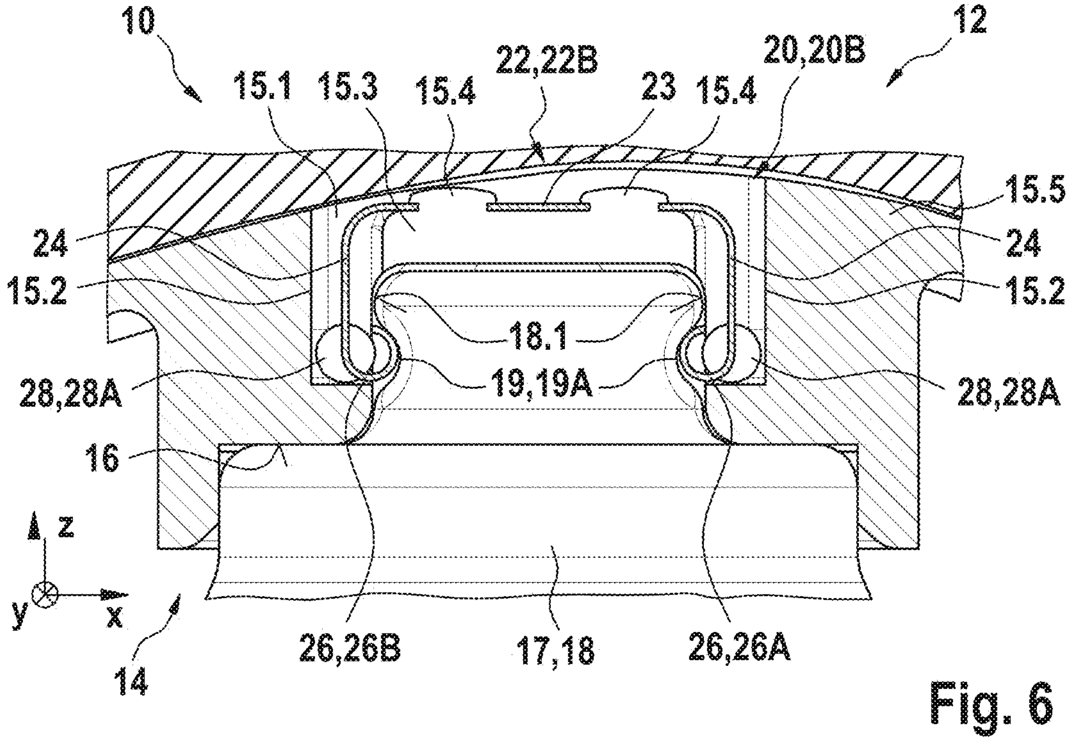
FIG. 6 shows a schematic cross-sectional diagram of a second exemplary embodiment of the fastening assembly for a pedal unit according to the disclosure.

As can be further seen from FIG. 6, the snap elements 26 in the illustrated second exemplary embodiment of the fastening assembly 20B are configured as round hooks 26B. In the snapped state shown, the rounded ends of the round hooks 26 reach behind a top edge of the undercuts 19 designed as recesses 19A. As can be further seen in particular from FIG. 5, the two legs 24 each have a slope of 90 degrees to the connecting bar 23 in the snapped state shown.

In a method for assembling such a pedal unit 7 as described above according to the disclosure, the pedal unit 7 is mounted in the vehicle without a pedal head 10. The pedal head 10, which comprises a pedal pad 12 releasably attached to a pad support 14, is then attached to a movable housing cover 17 of the pedal unit 7 such that the pad support 14 of the pedal head 10 is connected to the movable housing cover 17 of the pedal unit 7 via a releasable snap connection. This means that in toolless assembly, an axial force is applied from above to the pedal head 10, thereby spreading the legs 24 of the U-shaped spring-elastic retaining clips 22A, 22B. when the stop of the pad support 14 on the hat-shaped connection cap 18 of the movable housing cover 17 is reached, the legs 24 of the retaining clips 22A, 22B and the corresponding snap elements 26 spring into the recesses 19A of the hat-shaped connection cap 18 of the movable housing cover 17 and establish the snap connection between the pedal head 10 and the pad support 14 and the recesses 19A of the hat-shaped connection cap 18 of the movable housing 17. The transition to the snapped position is usually associated with a clicking noise, which is used as a sign of a successful placement of the pedal head 10 or the pad support 14.

Figure 4:
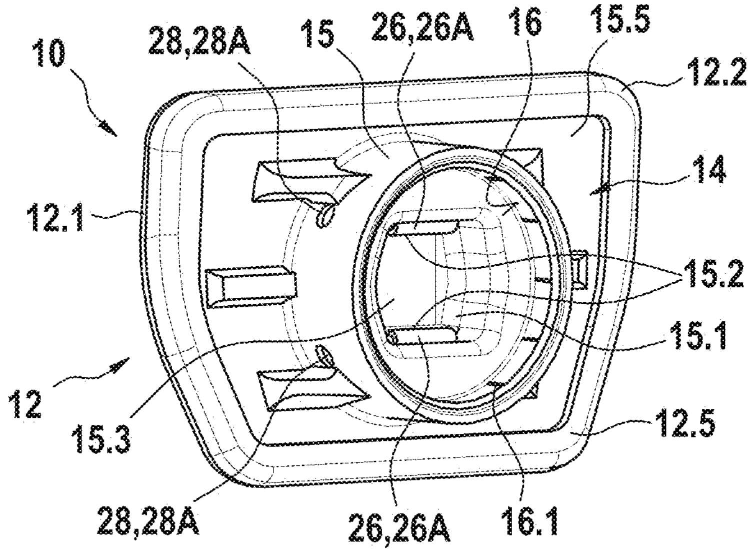
FIG. 4 shows a schematic perspective view of the pedal head of FIGS. 1 to 3 from below.

As can be further seen in particular from FIGS. 4 and 5, each hat-shaped connection cap 18 in the illustrated exemplary embodiments of the fastening assembly 20 above the recess 19A comprises a draft 18.1 which facilitates the spreading of the U-shaped spring-elastic retaining clips 22A, 22B. The mounting force to be applied is dependent on the thickness and width of the U-shaped spring-elastic retaining clips 22A, 22B, their pre-tension and their contour.

In a method according to the disclosure for disassembly of a pedal head 10 from a pedal unit 7 such as the one described above, a snap connection between a pad support 14 of the pedal head 10 and a movable housing cover 17 of the pedal unit 7 is released. The pedal head 10 is then lifted off of the movable housing cover 17.

The dismantling force to be applied depends substantially on the contour of the end region of the at least one snap element 26. Additionally, the dismantling force is also dependent on the thickness, width, and pre-tension of the U-shaped spring-elastic retaining clips 22A, 22B. Depending on the actuation force to be applied, the snap connection between the pad support 14 of the pedal head 10 and the movable housing cover 17 of the pedal unit 7 can be released without tools or with a simple auxiliary tool 30.

In the first exemplary embodiment of the fastening assembly 20A shown in FIGS. 2 to 5, in which the open ends of the snap hooks 26A reach behind the upper edge of the undercuts 19, which are designed as recesses 19A, relatively high dismantling forces or an auxiliary tool 30 are required to release the snap connection. In the second exemplary embodiment of the fastening assembly 20B shown in FIG. 6, in which the rounded ends of the round hooks 26B engage the upper edge of the undercuts 19, which are designed as recesses 19A, lower disassembly forces are required, so the snap connection can be released without tools. In the second exemplary embodiment, disassembly is additionally facilitated by the thinner sheet thickness of the U-shaped spring-elastic retaining clip 22B.

Figure 7:
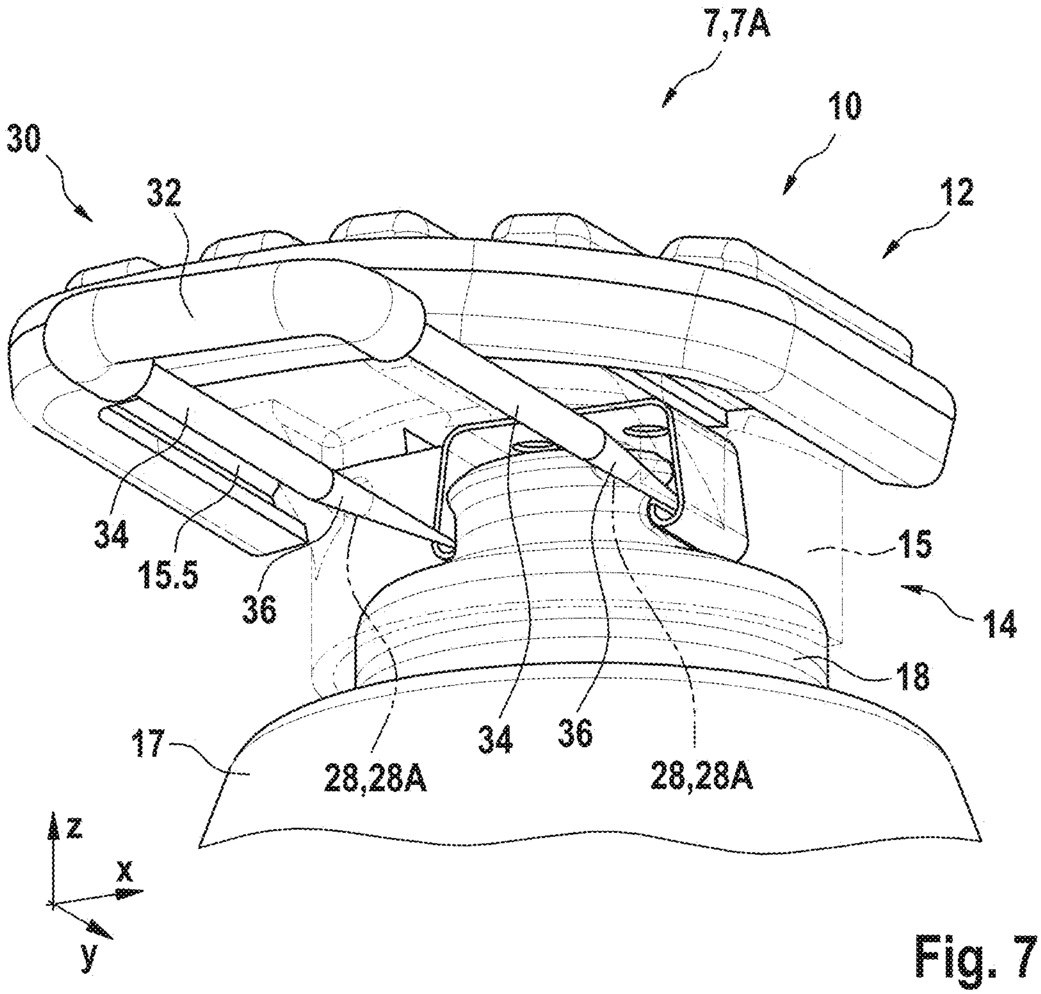
FIG. 7 shows a schematic perspective cross-sectional view of a section of the pedal unit of FIGS. 1 to 5 during disassembly of the pedal head.

As can be further seen from FIG. 7, the disassembly of the pedal head 10 in the illustrated first exemplary embodiment of the fastening assembly 20A is performed with the simple auxiliary tool 30. The auxiliary tool 30 for disassembly of the pedal head 10 comprises a handle portion 32 on which two parallel guide pins 34 are held. At the free ends, the guide pins 34 each have an insert chamfer 36 which interacts with the snap elements 26 of the U-shaped spring-elastic retaining clip 22A, embodied as snap hooks 26A, to release the snap connection between the pad support 14 and the movable housing cover 17. As can further be seen from FIGS. 5 to 7, openings 28, embodied as through holes 28A, for the introduction of auxiliary tool 30 for disassembly of the pedal head 10, are introduced in suitable locations of the pad support 14 to lead to the snap elements 28 and to the undercuts 19 embodied as recesses 19A. The sizing of the openings 28 and the auxiliary tool 30 are designed so that the auxiliary tool 30 can support itself on the walls of the openings 28 when the snap connection is released in order to dissipate the forces of the excessively tensioned U-shaped spring-elastic retaining clip 22A when it is spread to the base body 15 of the pad support 14. Preferably, the openings 28 for ensuring access of the auxiliary tool 30 to the snap elements 28 of the U-shaped spring-elastic retaining clip 22A are introduced on two opposite sides of the base body 15 of the pad support. As a result, the easier accessibility option to the U-shaped spring-elastic retaining clip 22A can be selected in the mounted state in the vehicle for the disassembly of the pedal head 10. The auxiliary tool 30 is designed to engage with the snap hooks 26A of the U-shaped spring-elastic retaining clip 22A when pressed into the openings 28 in the base body 15 of the pad support 14 as shown in FIG. 7, in order to progressively push the legs 24 of the U-shaped spring-elastic retaining clip 22A until the snap connection can be released and the pedal head 10 can be removed easily. In the final position of the auxiliary tool 30, the two snap hooks 25A no longer reach behind the upper edge of the undercuts 19 designed as recesses 19A, such that the pedal head 10 can be removed from the movable housing cover 17 with the pad support 14 in the vertical direction z of the pedal unit 5. The pedal head 10 can be reassembled after the auxiliary tool 30 is removed.

The invention claimed is:

1. A pedal unit for actuating a vehicle function, comprising:

a modularly constructed pedal head comprising a pad support and a replaceable pedal pad releasably connected to the pad support and configured to receive an actuation force of a driver's foot;

a housing cover comprising a hat-shaped connection cap on a housing cover front face that faces toward the pedal head; and a fastening assembly movable jointly with the housing cover with a small stroke along a vertical direction of the pedal unit;

wherein the pad support comprises, on a pad support front face that faces toward the housing cover, a receiving opening, a contour of which is adapted to the hat-shaped connection cap, wherein the fastening assembly comprises at least one undercut introduced on the hat-shaped connection cap and at least one retaining element arranged on the pad support, which are designed in an assembled state to form a releasable snap connection between the pad support and the housing cover, the releasable snap connection preventing or at least impeding movement of the pad support in a direction of disassembly, and wherein a recess for the at least one retaining element is defined into a base body of the pad support, which comprises at least one through-opening to the receiving opening and forms a support bar for the at least one retaining element.

2. The pedal unit according to claim 1, wherein at least one plastically deformable rib is arranged on an inner wall of the receiving opening in a base body of the pad support, the at least one plastically deformable rib resulting in a radial tolerance compensation with respect to the hat-shaped connection cap of the housing cover.

3. The pedal unit according to claim 1, wherein the at least one undercut is defined into the hat-shaped connection cap as a partial recess or as a circumferential recess.

4. The pedal unit according to claim 1, wherein the at least one retaining element is configured as a spring-elastic retaining clip with at least one snap element.

5. The pedal unit according to claim 4, wherein the at least one snap element is configured as a snap hook or as a round hook.

6. The pedal unit according to claim 4, wherein the spring-elastic retaining clip is U-shaped, with two legs connected to one another via a connecting bar, and a snap element of the at least one snap element is arranged at a respective free end of each of the two legs.

7. The pedal unit according to claim 6, wherein:

the connecting bar of the spring-elastic retaining clip rests on the support bar such that the two legs of the spring-elastic retaining clip each penetrate the at least one through-opening and each of the at least one snap elements is snapped into a corresponding undercut.

8. A method for assembling the pedal unit according to claim 1, comprising:

mounting the pedal unit in a vehicle without a pedal head; and subsequently attaching the pedal head, which comprises the pedal pad releasably attached to the pad support, to the housing cover of the pedal unit without tools, such that the pad support of the pedal head is connected to the housing cover of the pedal unit via a releasable connection.

9. A method for disassembling the pedal head from the pedal unit according to claim 1, comprising:

releasing a snap connection between the pad support of the pedal head and the housing cover of the pedal unit; and subsequently lifting the pedal head off from the housing cover.

10. A pedal unit for actuating a vehicle function, comprising:

a modularly constructed pedal head comprising a pad support and a replaceable pedal pad releasably connected to the pad support and configured to receive an actuation force of a driver's foot;

a housing cover comprising a hat-shaped connection cap on a housing cover front face that faces toward the pedal head; and a fastening assembly movable jointly with the housing cover with a small stroke along a vertical direction of the pedal unit;

wherein:

the pad support comprises, on a pad support front face that faces toward the housing cover, a receiving opening, a contour of which is adapted to the hat-shaped connection cap;

the fastening assembly comprises at least one undercut introduced on the hat-shaped connection cap and at least one retaining element arranged on the pad support, which are designed in an assembled state to form a releasable snap connection between the pad support and the housing cover, the releasable snap connection preventing or at least impeding movement of the pad support in a direction of disassembly;

the at least one retaining element is configured as a spring-elastic retaining clip with at least one snap element;

the spring-elastic retaining clip is U-shaped, with two legs connected to one another via a connecting bar, and a snap element of the at least one snap element is arranged at a respective free end of each of the two legs;

a recess for the at least one retaining element is defined into a base body of the pad support, which comprises at least one through-opening to the receiving opening and forms a support bar for the at least one retaining element; and the connecting bar of the spring-elastic retaining clip rests on the support bar such that the two legs of the spring-elastic retaining clip each penetrate the at least one through-opening and each of the at least one snap element is snapped into a corresponding undercut.

11. The pedal unit according to claim 10, wherein at least one plastically deformable rib is arranged on an inner wall of the receiving opening in a base body of the pad support, the at least one plastically deformable rib resulting in a radial tolerance compensation with respect to the hat-shaped connection cap of the housing cover.

12. The pedal unit according to claim 10, wherein the at least one undercut is defined into the hat-shaped connection cap as a partial recess or as a circumferential recess.

13. The pedal unit according to claim 10, wherein the at least one snap element is configured as a snap hook or as a round hook.

14. A method for assembling the pedal unit according to claim 10, comprising:

mounting the pedal unit in a vehicle without a pedal head; and subsequently attaching the pedal head, which comprises the pedal pad releasably attached to the pad support, to the housing cover of the pedal unit without tools, such that the pad support of the pedal head is connected to the housing cover of the pedal unit via a releasable connection.

15. A method for disassembling the pedal head from the pedal unit according to claim 10, comprising:

releasing a snap connection between the pad support of the pedal head and the housing cover of the pedal unit; and subsequently lifting the pedal head off from the housing cover.

* * * * *